US012641362B2

(12) United States Patent
Ito

(10) Patent No.: US 12,641,362 B2
(45) Date of Patent: May 26, 2026

(54) AUDIO OUTPUT DEVICE

(71) Applicant: ALPS ALPINE CO., LTD., Tokyo (JP)

(72) Inventor: Ryo Ito, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 154 days.

(21) Appl. No.: 18/618,237

(22) Filed: Mar. 27, 2024

(65) Prior Publication Data

US 2024/0340573 A1 Oct. 10, 2024

(30) Foreign Application Priority Data

Apr. 7, 2023 (JP) ................................. 2023-062612

(51) Int. Cl.
| *H04R 3/04* | (2006.01) |
| *B60N 2/879* | (2018.01) |
| *H04R 1/24* | (2006.01) |
| *H04R 3/12* | (2006.01) |

(52) U.S. Cl.
CPC ............... *H04R 1/24* (2013.01); *B60N 2/879* (2018.02); *H04R 3/04* (2013.01); *H04R 3/12* (2013.01); *H04R 2499/13* (2013.01)

(58) Field of Classification Search
CPC ........ H04R 3/12; H04R 2499/13; H04R 1/24; H04R 3/04; H04R 2430/03
See application file for complete search history.

(56) References Cited

U.S. PATENT DOCUMENTS

| 7,424,127 B1 * | 9/2008 | Holmi | .................... | H04R 5/023 |
| | | | | 381/86 |
| 11,838,740 B2 * | 12/2023 | Fryer | ..................... | H04R 1/345 |
| 11,951,889 B2 * | 4/2024 | Lade | ...................... | H04R 1/345 |
| 12,250,517 B2 * | 3/2025 | Fukui | ..................... | H04R 5/023 |
| 2003/0206639 A1 | 11/2003 | Griesinger | | |
| 2011/0170715 A1 | 7/2011 | Kim et al. | | |
| 2022/0159396 A1 | 5/2022 | Fryer et al. | | |

FOREIGN PATENT DOCUMENTS

JP 2003-111200 4/2003

OTHER PUBLICATIONS

Extended European Search Report for 24168017.2 mailed on Sep. 13, 2024.

* cited by examiner

*Primary Examiner* — Disler Paul
(74) *Attorney, Agent, or Firm* — IPUSA, PLLC

(57) ABSTRACT

An audio output device for outputting a sound corresponding to a first audio signal toward a first user in front of a second user and a sound corresponding to a second audio signal toward the second user in back of the first user is provided. The audio output device includes a first speaker configured to output a sound having a low-frequency component of the first audio signal toward the first user, and a sound having a high-frequency component of the second audio signal toward the second user; and a second speaker configured to output a sound having low-frequency and middle-frequency components of the second audio signal toward the second user. The first speaker is disposed in a vicinity of the first user, and the second speaker is disposed in a vicinity of the second user.

5 Claims, 6 Drawing Sheets

AUDIO OUTPUT DEVICE

CROSS-REFERENCE TO RELATED APPLICATIONS

This application is based on and claims priority to Japanese Patent Application No. 2023-062612, filed on Apr. 7, 2023, the entire contents of which are incorporated herein by reference.

BACKGROUND OF THE INVENTION

1. Field of the Invention

The present disclosure relates to an audio output device configured to output audio signals toward users in a plurality of seats arranged in the front and rear of a vehicle or the like.

2. Description of the Related Art

A sound processing device is known in which left and right speakers are installed in a headrest of a seat, and audio signals, which have passed through a sound image localization filter part and a trans-aural system filter part, are output from the left and right speakers, thereby localizing a sound image at a predetermined position (see Japanese Laid-open Patent Publication No. 2003-111200, for example).

SUMMARY OF THE INVENTION

According to an embodiment of the present disclosure, an audio output device for outputting a sound corresponding to a first audio signal toward a first user in front of a second user and a sound corresponding to a second audio signal toward the second user in back of the first user is provided. The audio output device includes a first speaker configured to output a sound having a low-frequency component of the first audio signal toward the first user, and a sound having a high-frequency component of the second audio signal toward the second user; and a second speaker configured to output a sound having low-frequency and middle-frequency components of the second audio signal toward the second user. The first speaker is disposed in a vicinity of the first user, and the second speaker is disposed in a vicinity of the second user.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
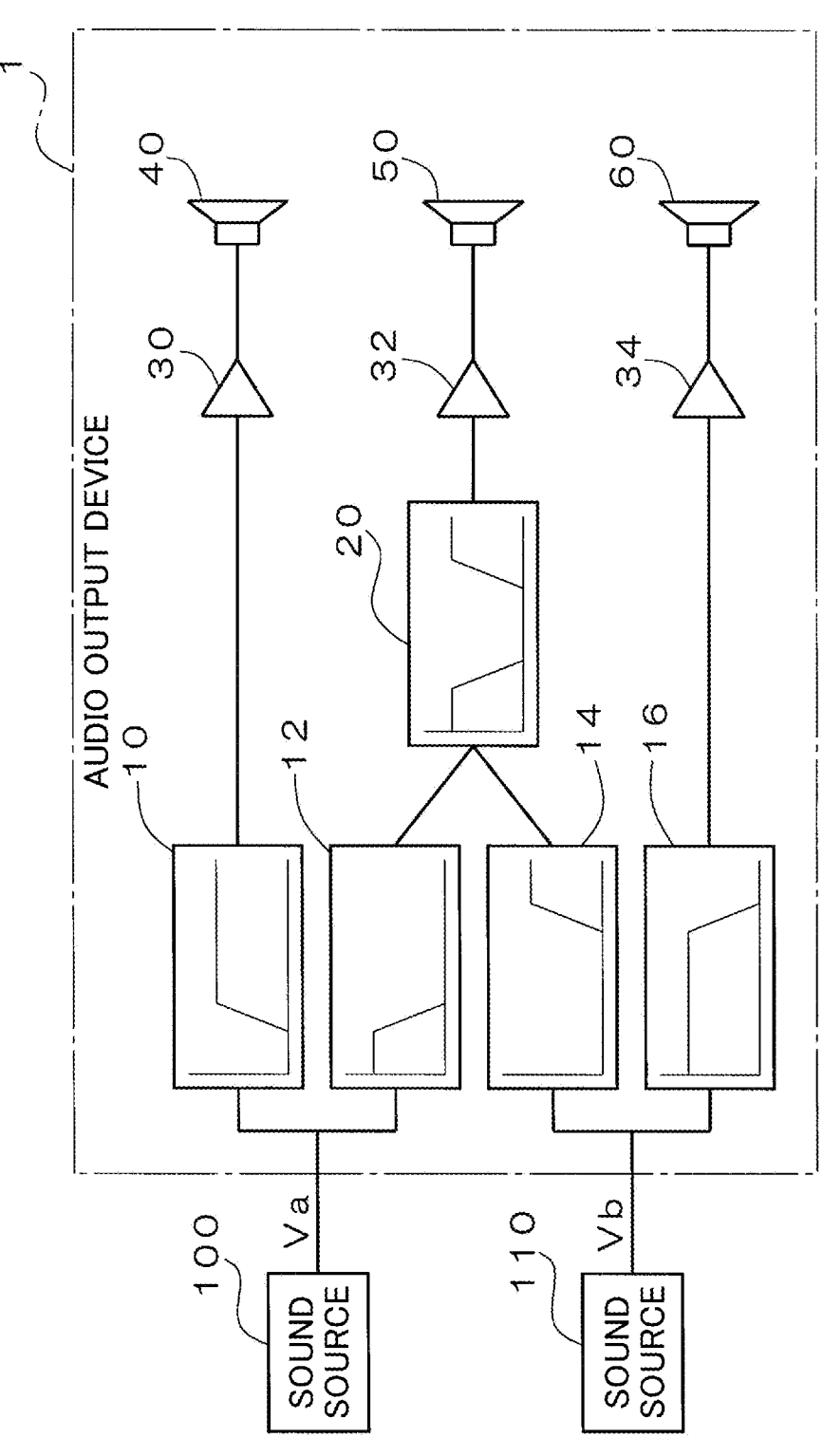
FIG. 1 is a diagram illustrating a configuration of an audio output device according to an embodiment.

In the sound processing device described in Japanese Laid-open Patent Publication No. 2003-111200, a sound image can be accurately localized by taking into consideration the shape of the headrest, the position of the ears of a user, and the like; however, the sound processing device has a problem in that, in order to localize a sound image in front of the user who listens to the audio, a configuration and a process may be complicated.

According to an embodiment of the present disclosure, it is desirable to provide an audio output device that can localize a sound image in front of a user with a simple configuration and process.

According to an embodiment of the present disclosure, an audio output device for outputting a sound corresponding to a first audio signal toward a first user in front of a second user and a sound corresponding to a second audio signal toward the second user in back of the first user is provided. The audio output device includes a first speaker configured to output a sound having a low-frequency component of the first audio signal toward the first user, and a sound having a high-frequency component of the second audio signal toward the second user; and a second speaker configured to output a sound having low-frequency and middle-frequency components of the second audio signal toward the second user. The first speaker is disposed in a vicinity of the first user, and the second speaker is disposed in a vicinity of the second user.

The first speaker disposed in the vicinity of the first user provides the first user with the sound having the low-frequency component of the first audio signal, and provides the second user with the sound having the high-frequency component of the second audio signal. Further, by outputting a part (high-frequency component) of the second audio signal from the front of the second user, a sound image can be easily localized in front of the second user with a simple configuration and process.

The audio output device further includes a low-frequency separator configured to separate the low-frequency component from the first audio signal; a high-frequency separator configured to separate the high-frequency component from the second audio signal; and an adder configured to add the low-frequency component of the first audio signal, separated by the low-frequency separator, and the high-frequency component of the second audio signal, separated by the second audio signal, and output the added frequency components to the first speaker. Accordingly, sounds to be output from the first speaker can be generated only by separating the low-frequency component from the first audio signal, separating the high-frequency component from the second audio signal, and then adding the separated components. Thus, a configuration and a process for achieving the above can be simplified.

Further, the above-described first speaker is preferably disposed to face the second user. Accordingly, the sound having the high-frequency component of the second audio signal, which has a short wavelength and straightness, can be transmitted to the second user, and the sound having the low-frequency component of the first audio signal, which has a long wavelength and spreads spherically, can be transmitted to the first user.

Further, the above-described first speaker is preferably provided in a headrest of a seat on which the first user is to be seated. Accordingly, sounds can be emitted near the ears of the user. Thus, sounds of a plurality of audio signals can be prevented from being mixed.

Further, a size of the above-described first speaker is preferably larger than a high-pass cutoff frequency used by the high-frequency separator to separate the high-frequency component. Further, the above-described first speaker is preferably provided in a headrest of a seat on which the first user is to be seated; and a wavelength of a low-pass cutoff frequency used by the low-frequency separator to separate the low-frequency component is preferably shorter than a length of the headrest in a short-side direction. By setting the size of the first speaker and the frequency of the low-frequency component of the second audio signal to be output from the first speaker as described above, the directivity of the sound having the low-frequency component can be broadened, and thus the sound having the low-frequency component can propagate spherically around the first speaker.

An audio output device to which one embodiment of the present invention is applied will be described below with reference to the drawings.

FIG. 1 is a diagram illustrating a configuration of an audio output device 1 according to an embodiment. As illustrated in FIG. 1, the audio output device 1 of the present embodiment includes four frequency band splitters 10, 12, 14, and 16, an adder 20, three amplifiers 30, 32, and 34, and three types of speakers 40, 50, and 60.

In the present embodiment, it is assumed that two users A and B face a predetermined direction, and the user A is located in front of the user B and the user B is located in back of the user A. Audio provided from a sound source 100 is output toward the user A in front, and another audio provided from a sound source 110 is output toward the user B in the rear.

The term "audio" used in the present specification and the claims includes not only voices uttered by humans, but also a wide range of sounds in a frequency band that is audible to humans, such as various sounds of musical instruments and sounds present in nature. Further, the sound sources 100 and 110 are sources of audio signals. Each of the sound sources 100 and 110 may be any combination of devices that output audio signals, such as an audio playback device, a radio receiver, a television receiver, and a playback device for music and video contents received via a network.

An audio signal Va output from the sound source 100 is input into the frequency band splitter 10, and the frequency band splitter 10 separates a band of middle frequencies and higher frequencies (middle frequencies and high frequencies, for example, 200 Hz and higher) from the audio signal Va. The amplifier 30 amplifies an output signal of the frequency band splitter 10 and drives the speaker 40.

The audio signal Va output from the sound source 100 is input into the frequency band splitter 12, and the frequency band splitter 12 separates a band of low frequencies (for example, 200 Hz and lower) from the audio signal Va. An audio signal Vb output from the sound source 110 is input into the frequency band splitter 14, and the frequency band splitter 14 separates a band of high frequencies (for example, 5 kHz and higher) from the audio signal Va. The adder 20 adds output signals of the two frequency band splitters 12 and 14. The amplifier 32 amplifies an output signal of the adder 20 and drives the speaker 50.

The audio signal Vb output from the sound source 110 is input into the frequency band splitter 16, and the frequency band splitter 16 separates into a band of middle frequencies and lower frequencies (middle frequencies and low frequencies, for example, 5 kHz and lower) from the audio signal Vb. The amplifier 34 amplifies an output signal of the frequency band splitter 16 and drives the speaker 60. Full-range speakers are used as the speakers 40, 50, and 60.

The user A described above corresponds to a first user, the user B corresponds to a second user, the audio signal Va corresponds to a first audio signal, the audio signal Vb corresponds to a second audio signal, the speaker 50 corresponds to a first speaker, and the speaker 60 corresponds to a second speaker. Further, the frequency band splitter 12 corresponds to a low-frequency separator, the frequency band splitter 14 corresponds to a high-frequency separator, and the adder 20 corresponds to an adder.

Figure 2:
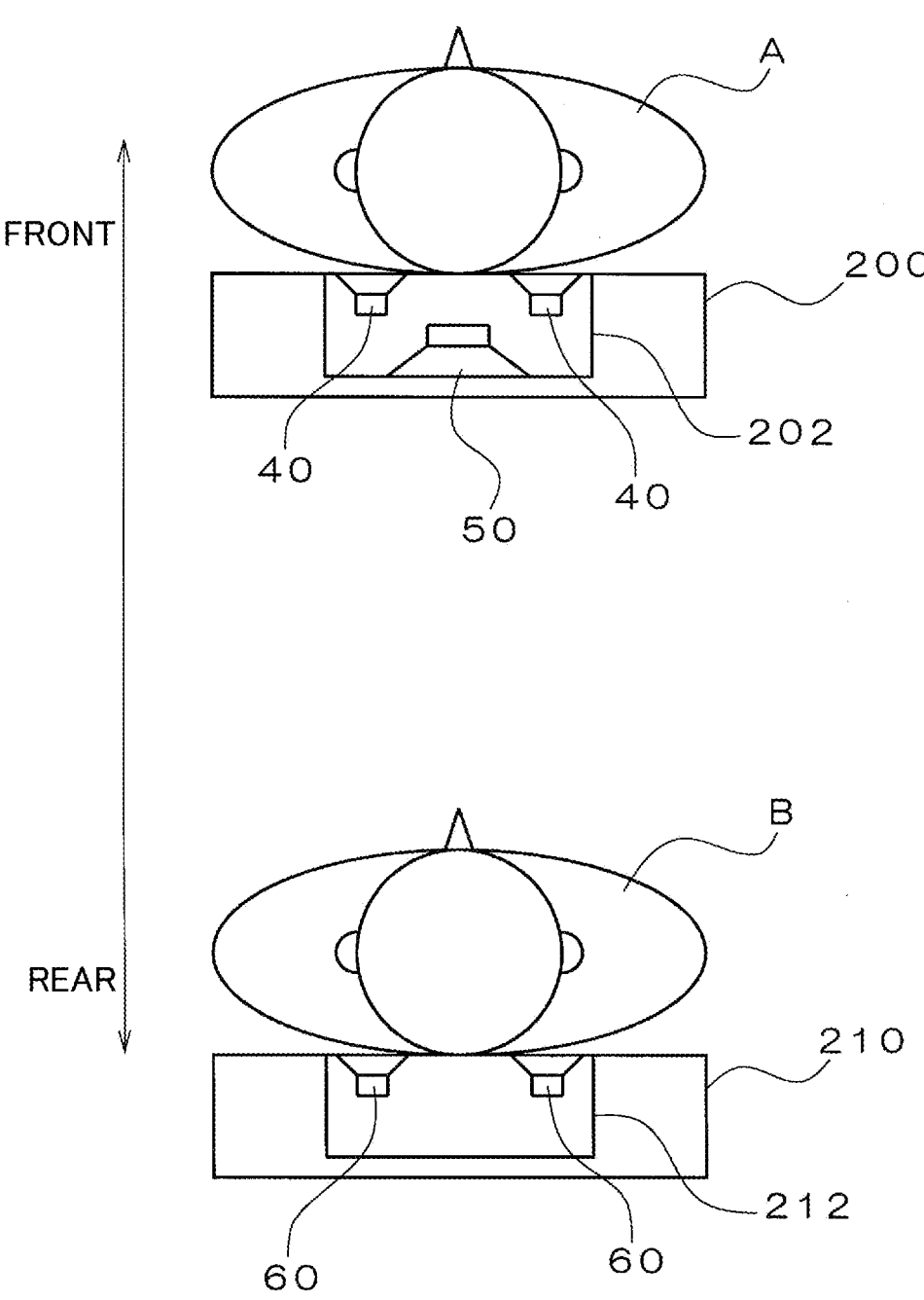
FIG. 2 is a diagram illustrating a positional relationship between speakers according to the embodiment.

FIG. 2 is a diagram illustrating a positional relationship between speakers. In the present embodiment, the user A in front is seated on a seat 200, and a headrest 202 is provided at a position where the head of the user A contacts the headrest 202. Further, the user B in the rear is seated on a seat 210, and a headrest 212 is provided at a position where the head of the user B contacts the headrest 212.

Speakers 40 and a speaker 50 are built in the headrest 202 of the front seat 200. Specifically, the speakers 40 are disposed such that baffles of the speakers 40 face the head of the user A. Further, the speaker 50 is disposed such that a baffle of the speaker 50 faces the user B.

Speakers 60 are built in the headrest 212 of the rear seat 210. Specifically, the speakers 60 are disposed such that baffles of the speakers 60 face the head of the user B.

After middle-frequency components and high-frequency components are separated by the frequency band splitter 10 from the signal Va output from the sound source 100, the frequency components are amplified by the amplifier 30 and output from each of the speakers 40. In addition, after low-frequency components are separated from the signal Va by the frequency band splitter 12, the frequency components are amplified by the amplifier 32 and output from the speaker 50.

Further, after high-frequency components are separated by the frequency band splitter 14 from the signal Vb output from the sound source 110, the frequency components are amplified by the amplifier 32 and output from the speaker 50. In addition, after low-frequency components and middle-frequency components are separated by the frequency band splitter 16 from the signal Vb, the frequency components are amplified by the amplifier 34 and output from each of the speakers 60.

In the present embodiment, audio obtained by adding (synthesizing) the low-frequency components of the audio signal Va for the user A and the high-frequency components of the audio signal Vb for the user B is output from the common speaker 50. For this purpose, the following design considerations are taken into account.

The size of the speaker 50 (the size of the baffle) is set to be sufficiently larger than the wavelength of a high-pass cutoff frequency (5 kHz or higher) used by the frequency band splitter 14 to separate the high-frequency components of the audio signal Vb. Further, the wavelength of a low-pass cutoff frequency (200 Hz or lower), used by the frequency band splitter 12 to separate the low-frequency components of the audio signal Va to be input into the speaker 50, is set to be sufficiently shorter than the length, in the short-side direction (the front-rear direction in which the users A and B are aligned), of the headrest 202 of the seat 200 in which the speaker 50 is installed. By setting the frequency band splitters 12 and 14 as described above, the directivity of a sound having the low-frequency components of the audio signal Va, lower than the high-pass cutoff frequency of the frequency band splitter 14, can be broadened, and thus the sound having the low-frequency components of the audio signal Va can propagate spherically around the headrest 202 with the speaker 50 as the center.

Further, a sound having the high-frequency components of the audio signal Vb output from the speaker 50 has narrow directivity, straightness, and less attenuation over distance. Thus, the user B located at a position away from the speaker 50 can hear the high-frequency components of the audio signal Vb output from the speaker 50 together with the low-frequency and middle-frequency components of the audio signal Vb output from each of the speakers 60.

Accordingly, the audio output device 1 according to the present embodiment allows the speaker 50 disposed in the vicinity of the user A to provide the user A with the sound having the low-frequency components of the audio signal Va, and provide the user B with the sound having the high-frequency components of the audio signal Vb. In addition, by outputting a part (high-frequency components) of the audio signal Vb from the front of the user B, a sound image can be easily localized in front of the user B with a simple configuration and process.

Further, sounds to be output from the speaker 50 can be generated only by separating the low-frequency components from the audio signal Va, separating the high-frequency components from the audio signal Vb, and then adding the components by the adder 20. Thus, a configuration and a process for achieving the above can be simplified.

Further, by installing the speaker 50 and the like in the headrests 202 and 212 of the seats 200 and 210 on which the users A and B are seated, sounds can be emitted near the ears of the users A and B. Thus, sounds of a plurality of audio signals can be prevented from being mixed.

The present invention is not limited to the above-described embodiment, and various modifications can be made within the scope of the present invention.

First Modification

In the audio output device 1 illustrated in FIG. 1, the audio signal Va output from the sound source 100 is split into the middle-frequency and high-frequency components and the low-frequency components, and the audio signal Vb output from the sound source 110 is split into the high-frequency components and the low-frequency and middle-frequency components. However, each of the audio signals Va and Vb may be split into low-frequency components, middle-frequency components, and high-frequency components.

Figure 3:
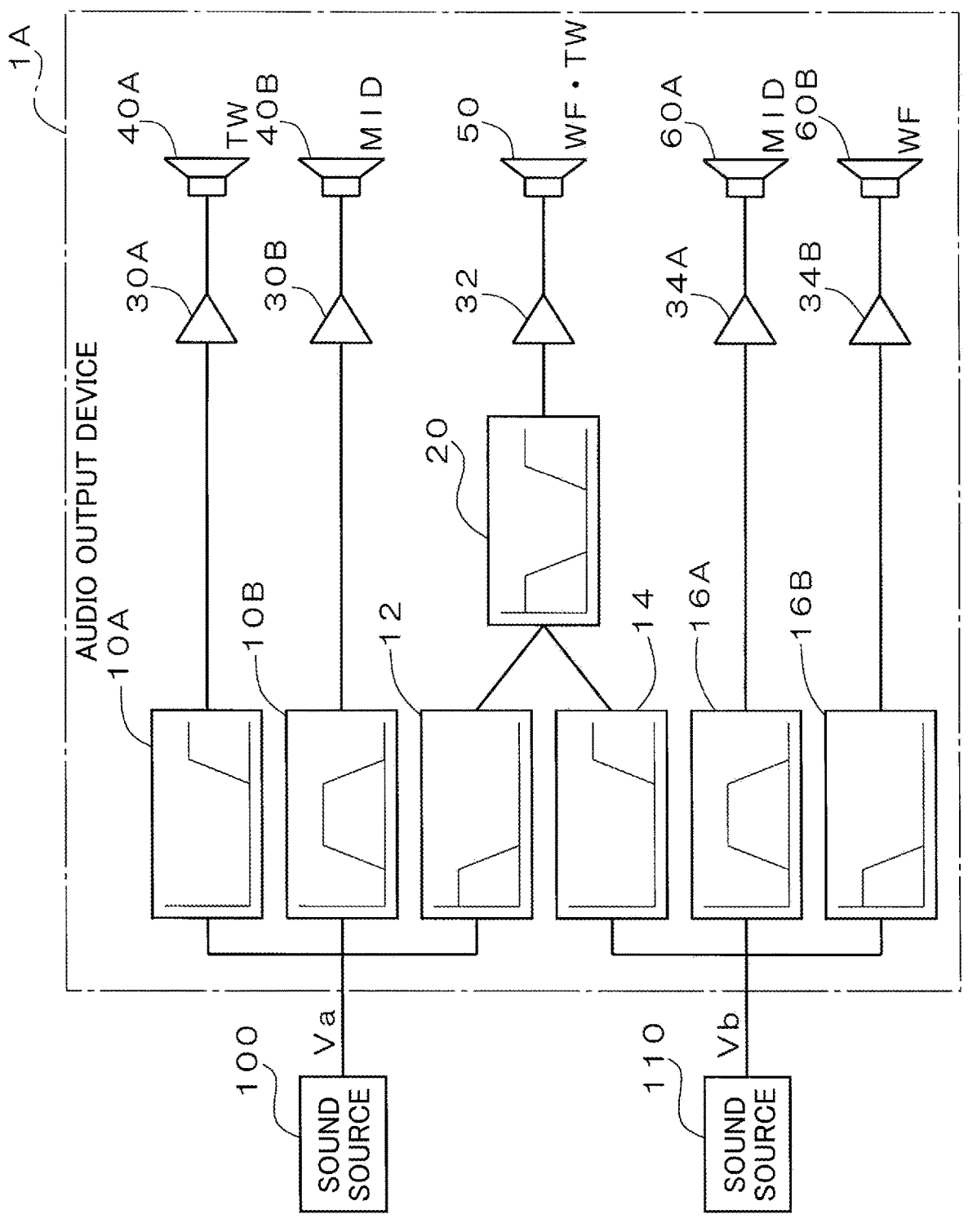
FIG. 3 is a diagram illustrating a configuration of an audio output device according to a first modification.

FIG. 3 is a diagram illustrating a configuration of an audio output device 1A according to the first modification. The audio output device 1A illustrated in FIG. 3 is obtained by replacing the frequency band splitter 10, the amplifier 30, and the speaker 40 of the audio output device 1 illustrated in FIG. 1 with frequency band splitters 10A and 10B, amplifiers 30A and 30B, and speakers 40A and 40B, and replacing the frequency band splitter 16, the amplifier 34, and the speaker 60 of the audio output device 1 illustrated in FIG. 1 with frequency band splitters 16A and 16*b*, amplifiers 34A and 34B, and speakers 60A and 60B. The frequency band splitters 12 and 14, the adder 20, the amplifier 32, and the speaker 50 are not changed, and the operations thereof are the same.

The audio signal Va output from the sound source 100 is input into the frequency band splitter 10A, and the frequency band splitter 10A separates a band of high-frequencies (for example, 5 kHz and higher) from the audio signal Va. The amplifier 30A amplifies an output signal of the frequency band splitter 10A and drives the speaker 40A (tweeter).

The audio signal Va output from the sound source 100 is input into the frequency band splitter 10B, and the frequency band splitter 10B separates a band of middle-frequencies (for example, 200 Hz to 5 kHz) from the audio signal Va. The amplifier 30B amplifies an output signal of the frequency band splitter 10B and drives the speaker 40B (mid-range speaker).

The audio signal Vb output from the sound source 110 is input into the frequency band splitter 16A, and the frequency band splitter 16A separates a band of middle-frequencies (for example, 200 Hz to 5 kHz) from the audio signal Vb. The amplifier 34A amplifies an output signal of the frequency band splitter 16A and drives the speaker 60A (mid-range speaker).

The audio signal Vb output from the sound source 110 is input into the frequency band splitter 16B, and the frequency band splitter 16B separates a band of low-frequencies (for example, 200 Hz and lower) from the audio signal Vb. The amplifier 34B amplifies an output signal of the frequency band splitter 16B and drives the speaker 60B (woofer).

Figure 4:
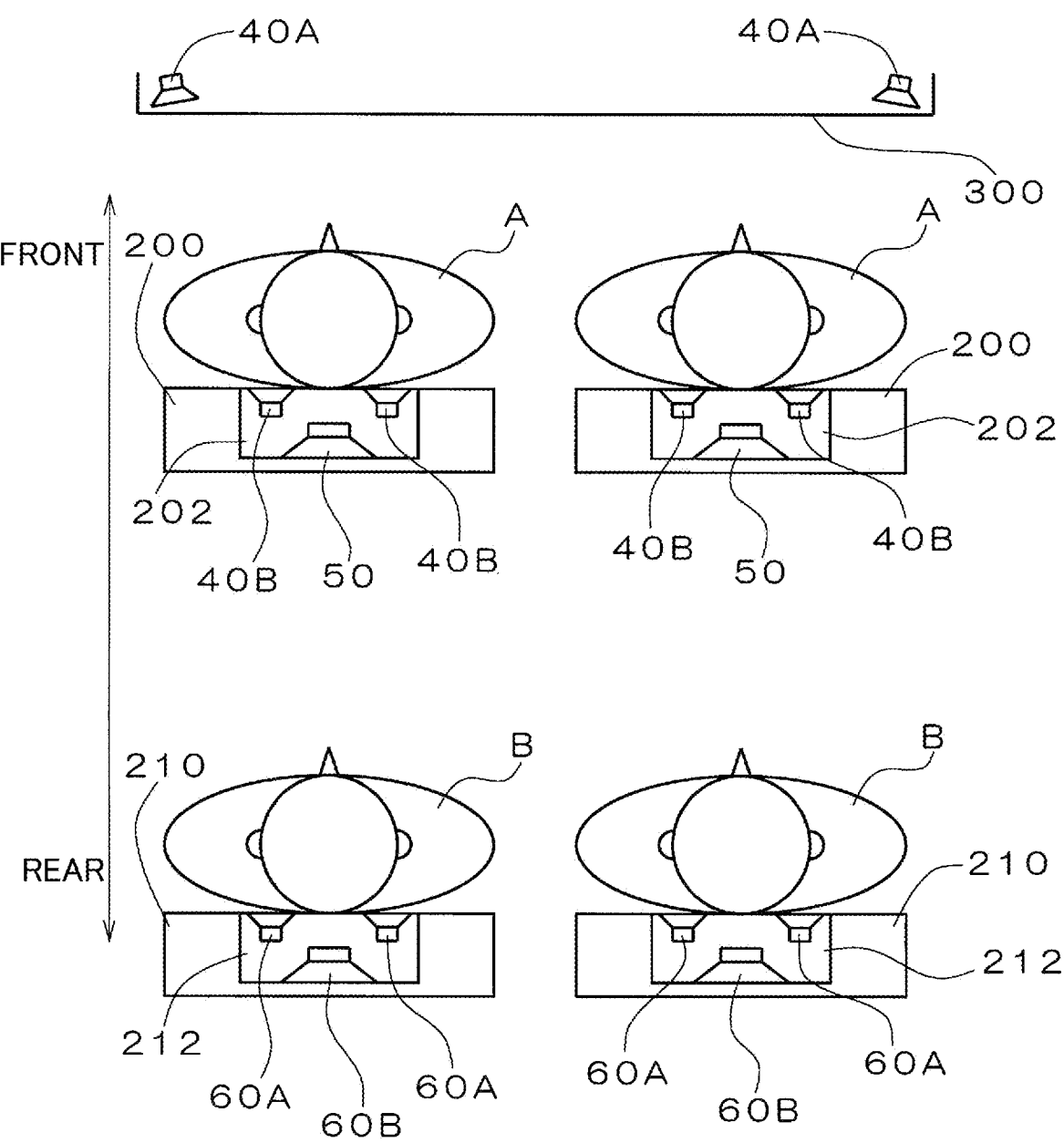
FIG. 4 is a diagram illustrating a positional relationship between speakers according to the modification illustrated in FIG. 3.

FIG. 4 is a diagram illustrating a positional relationship between speakers according to the first modification illustrated in FIG. 3. In this modification, it is assumed that four users are in a vehicle. Two users A in the front seats use three types of speakers 40A, 40B, and 50 to listen to audio of the audio signal Va output from the sound source 100, and two users B in the rear seats use three types of speakers 50, 60A, and 60B to listen to audio of the audio signal Vb output from the sound source 110. The speaker arrangement illustrated in FIG. 4 differs from the speaker arrangement illustrated in FIG. 2 in that, on the front seat side, audio having high-frequency components of the audio signal Va is output from the speakers 40A built in a dashboard 300, and audio having middle-frequency components of the audio signal Va is output from the speakers 40B built in headrests 202. On the rear seat side, audio having middle-frequency components of the audio signal Vb is output from the speakers 60A built in headrests 212, and audio having low-frequency components of the audio signal Vb is output from the speakers 60B built in the headrests 212. The principle of transmitting the audio having the low-frequency components output from the speakers 60B to the users B in the rear seats is the same as the principle of transmitting audio having low-frequency components output from the speakers 50 in the headrests 202 to the users A in the front seats, and the audio having the low-frequency components of the audio signal Vb propagates spherically around the headrests 212 with the speakers 60B as the center.

Accordingly, by outputting the audio having the high-frequency components of the audio signal Va from the speakers 40A disposing in the dashboard 300, some sounds can be transmitted from the front of the users A in the front seats, and thus in-front localization can be easily achieved. Further, by disposing the speakers 60B, which are woofers, in the headrests 212 of the rear seats, the low-frequency components can be sufficiently secured.

Second Modification

In the audio output device 1A illustrated in FIG. 3, the two users A in the front seats listen to the audio of the same audio signal Va, and the two users B in the rear seats listen to the audio of the same audio signal Vb. However, four users A (AR and AL) and B (BR and BL) may individually listen to audio of four audio signals VaR, VaL, VbR, and VbL output from four sound sources 100R, 100L, 110R, and 110L.

Figure 5:
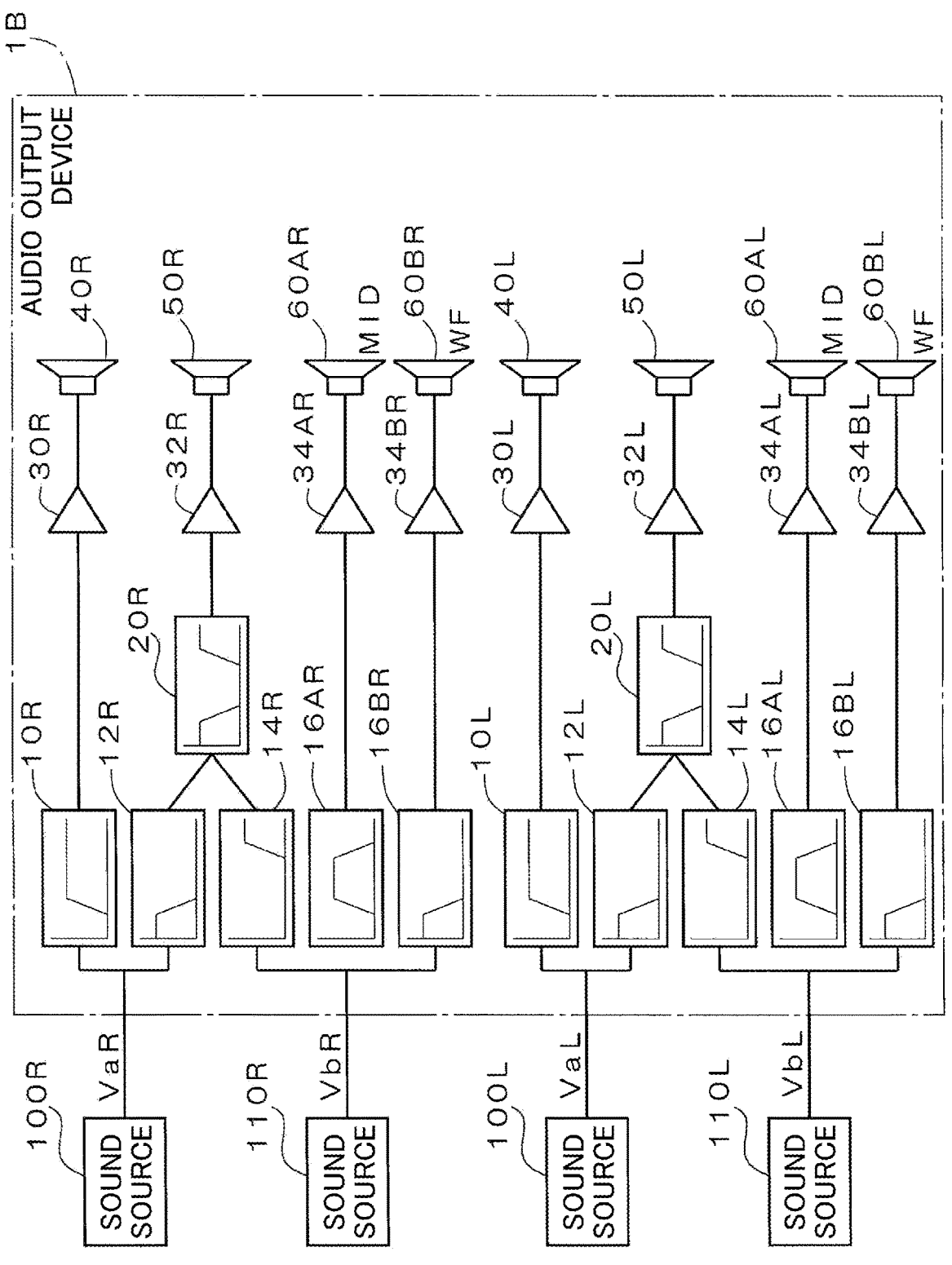
FIG. 5 is a diagram illustrating a configuration of an audio output device according to a second modification.

FIG. 5 is a diagram illustrating a configuration of an audio output device 1B according to a second modification. The audio output device 1B illustrated in FIG. 5 differs from the audio output device 1 illustrated in FIG. 1 in that the audio output device 1B includes left and right (two) systems in order to individually provide the four users in a vehicle with audio of the four audio signals VaR, VaL, VbR, and VbL output from the four sound sources 100R, 100L, 110R, and 110L.

Specifically, the audio output device 1B includes, as the right system, five frequency band splitters 10R, 12R, 14R, 16AR, 16BR, an adder 20R, four amplifiers 30R, 32R, 34AR, 34BR, and four types of speakers 40R, 50R, 60AR, 60BR. Further, the audio output device 1B includes, as the left system, five frequency band splitters 10L, 12L, 14L, 16AL, 16BL, an adder 20L, four amplifiers 30L, 32L, 34AL, and 34BL, and four types of speakers 40L, 50L, 60AL, and 60BL.

The audio signal VbR output from a sound source 110R is input into the frequency band splitter 16AR, and the frequency band splitter 16AR separates a band of middle-frequencies (for example, 200 Hz to 5 kHz) from the audio signal VbR. The amplifier 34AR amplifies an output signal of the frequency band splitter 16AR and drives the speaker 60AR (mid-range speaker).

The audio signal VbR output from the sound source 110R is input into the frequency band splitter 16BR, and the frequency band splitter 16BR separates a band of low-frequencies (for example, 200 Hz and lower) from the audio signal VbR. The amplifier 34BR amplifies an output signal of the frequency band splitter 16BR and drives the speaker 60BR (woofer).

The audio signal VbL output from a sound source 110L is input into the frequency band splitter 16AL, and the frequency band splitter 16AL separates a band of middle-frequencies (for example, 200 Hz to 5 kHz) from the audio signal VbL. The amplifier 34AL amplifies an output signal of the frequency band splitter 16AL and drives the speaker 60AL (mid-range speaker).

The audio signal VbL output from the sound source 110L is input into the frequency band splitter 16BL, and the frequency band splitter 16BL separates a band of low-frequencies (for example, 200 Hz and lower) from the audio signal VbL. The amplifier 34BL amplifies an output signal of the frequency band splitter 16BL and drives the speaker 60BL (woofer).

Operations of the other components (the frequency band splitters 10R, 12R, and 14R, the adder 20R, the amplifiers 30R and 32R, and the speakers 40R and 50R, which are included in the right system, and the frequency band splitters 10L, 12L, and 14L, the adder 20L, the amplifiers 30L and 32L, and the speakers 40L and 50L, which are included in the left system) are the same as the operations of the components illustrated in FIG. 1, and the description thereof will not be repeated.

Figure 6:
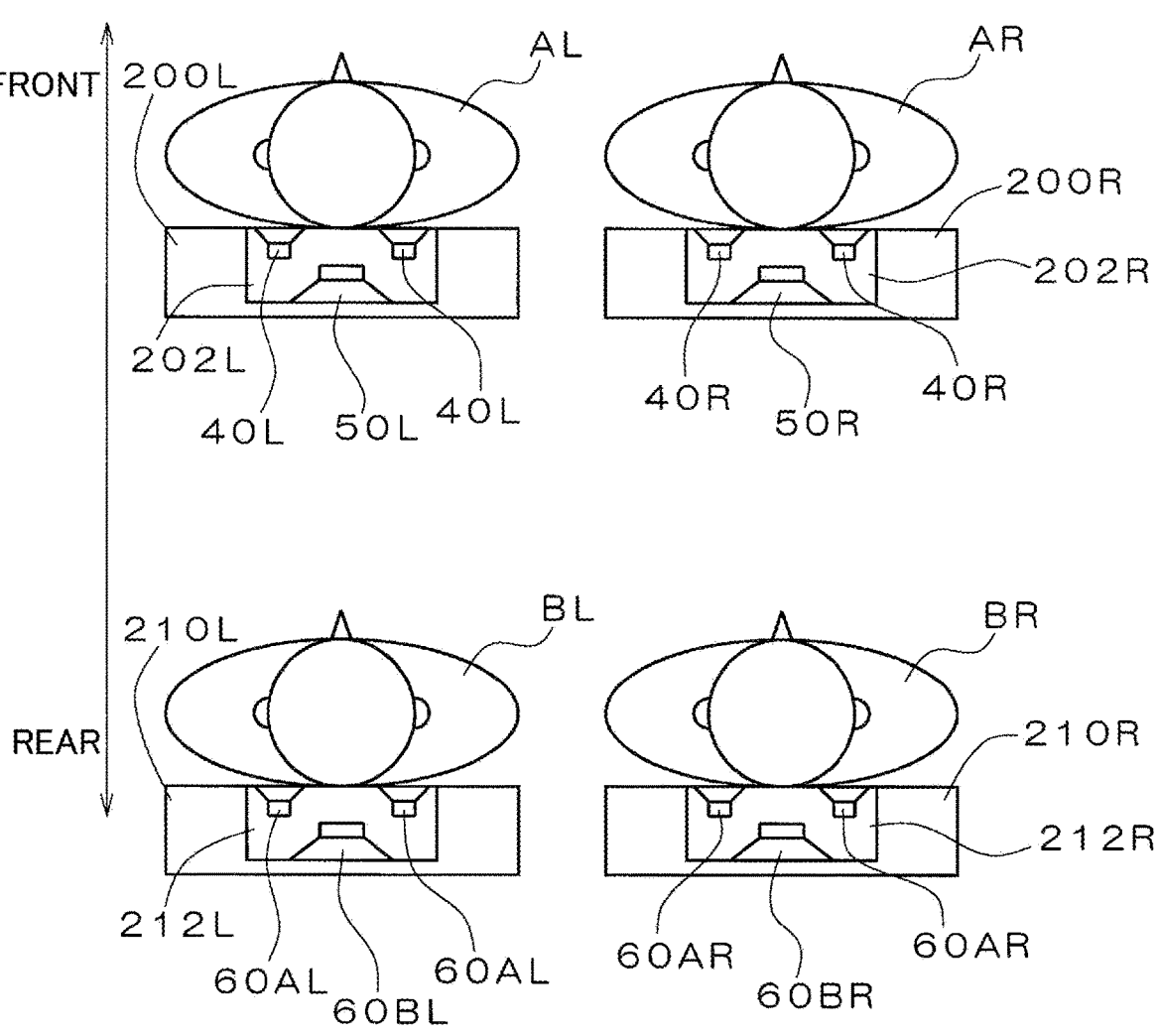
FIG. 6 is a diagram illustrating a positional relationship between speakers according to the modification illustrated in FIG. 5.

FIG. 6 is a diagram illustrating a positional relationship between speakers according to the second modification illustrated in FIG. 5. In this modification, it is assumed that four users are in a vehicle. The user AR in the front right seat uses two types of speakers 40R and 50R to listen to audio of the audio signal VaR output from the sound source 100R, and the user AL in the front left seat uses two types of speakers 40L and 50L to listen to audio of the audio signal VaL output from the sound source 100L. Further, the user BR in the rear right seat uses three types of speakers 50R, 60AR, and 60BR to listen to audio of the audio signal VbR output from the sound source 110R, and the user BL in the rear left seat uses three types of speakers 50L, 60AL, and 60BL to listen to audio of the audio signal VbL output from the sound source 110L.

In this modification, the speakers 40R and 40L configured to output audio having middle/high-frequency components and the speakers 50R and 50L configured to output audio obtained by synthesizing low-frequency components and high-frequency components are built in headrests 202R and 202L of front seats 200R and 200L. This configuration is the same as the configuration of the embodiment illustrated in FIG. 2. For the users AR and AL in the front seats, the directivity of sounds having the low-frequency components of the audio signals VaR and VaL can be broadened, and thus the sounds having the low frequency components of the audio signals VaR and VaL can propagate spherically around the headrests 202R and 202L with the speakers 50R and 50L as the center.

Further, the speakers 60AR and 60AL, which are mid-range speakers, and the speakers 60BR and 60BL, which are woofers, are built in headrests 212R and 212L of rear seats 210R and 210L. This configuration is the same as the configuration of the first modification illustrated in FIG. 4. Low-frequency components can be sufficiently secured for audio provided to the users BR and BL in the rear seats.

INDUSTRIAL APPLICABILITY

As described above, according to the present invention, the first speaker disposed in the vicinity of the first user provides the first user with the sound having the low-frequency components of the first audio signal, and provides the second user with the sound having the high-frequency components of the second audio signal. Further, by outputting a part (high-frequency components) of the second audio signal from the front of the second user, a sound image can be easily localized in front of the second user with a simple configuration and process.

What is claimed is:

1. An audio output device for outputting a sound corresponding to a first audio signal toward a first user in front of a second user and a sound corresponding to a second audio signal toward the second user in back of the first user, the audio output device comprising:

a first speaker configured to output
    a sound having a low-frequency component of the first audio signal toward the first user, and
    a sound having a high-frequency component of the second audio signal toward the second user;
a second speaker configured to output a sound having low-frequency and middle-frequency components of the second audio signal toward the second user;
a low-frequency separator configured to separate the low-frequency component from the first audio signal;
a high-frequency separator configured to separate the high-frequency component from the second audio signal; and
an adder configured to add the low-frequency component of the first audio signal, separated by the low-frequency separator, and the high-frequency component of the second audio signal, separated by the high-frequency separator, and output the added frequency components to the first speaker,
wherein the first speaker is disposed in a vicinity of the first user, and the second speaker is disposed in a vicinity of the second user.

2. The audio output device according to claim 1, wherein the first speaker is disposed to face the second user.

3. The audio output device according to claim 2, wherein the first speaker is provided in a headrest of a seat on which the first user is to be seated.

4. The audio output device according to claim 1, wherein a size of the first speaker is larger than a high-pass cutoff frequency used by the high-frequency separator to separate the high-frequency component.

5. The audio output device according to claim 1, wherein the first speaker is provided in a headrest of a seat on which the first user is to be seated; and a wavelength of a low-pass cutoff frequency used by the low-frequency separator to separate the low-frequency component is shorter than a length of the headrest in a short-side direction.

* * * * *